United States Patent [19]

Golden

[11] Patent Number: 4,934,652

[45] Date of Patent: Jun. 19, 1990

[54] DUAL STAGE VALVE ACTUATOR

[75] Inventor: Thomas A. Golden, Dallas, Tex.

[73] Assignee: Otis Engineering Corporation, Carrollton, Tex.

[21] Appl. No.: 449,707

[22] Filed: Dec. 11, 1989

[51] Int. Cl.$^5$ .......................................... F16K 31/122
[52] U.S. Cl. ...................................... 251/63.6; 92/62; 92/65; 251/327; 251/328
[58] Field of Search ................. 92/62, 65; 251/62, 63, 251/63.4, 63.5, 63.6, 193, 326, 327, 328, 329; 137/556

[56] References Cited

U.S. PATENT DOCUMENTS

| | | | |
|---|---|---|---|
| 3,244,399 | 4/1966 | Jones et al. | 251/62 |
| 3,958,592 | 5/1976 | Wells et al. | 137/315 |
| 3,993,284 | 11/1976 | Lukens, Jr. | 251/63.6 |
| 4,199,131 | 4/1980 | Boski et al. | 251/62 |
| 4,230,299 | 10/1980 | Pierce, Jr. | 251/14 |
| 4,240,463 | 12/1980 | Moore | 137/492.5 |
| 4,274,432 | 6/1981 | Tunstall et al. | 137/315 |
| 4,529,300 | 7/1985 | Boski | 403/2 |
| 4,535,967 | 8/1985 | Babbitt et al. | 251/54 |
| 4,568,058 | 2/1986 | Shelton | 251/62 |
| 4,585,207 | 4/1986 | Shelton | 251/63.6 |
| 4,836,243 | 6/1989 | Ferrell | 137/556 |
| 4,869,458 | 9/1989 | Susini et al. | 92/62 |

Primary Examiner—George L. Walton
Attorney, Agent, or Firm—Dennis T. Griggs

[57] ABSTRACT

An actuator for opening and closing the gate of a surface safety valve includes a primary piston and an auxiliary piston. The primary drive piston is directly connected to the valve stem, while the auxiliary piston is slideably connected thereto. Extension movement of the auxiliary piston is stopped by a divider plate after initial breakaway forces are overcome. The thrusting force developed by the auxiliary piston during a valve opening operation is transmitted to the valve stem and the primary piston by a shuttle sleeve. The shuttle sleeve is radially spaced about the valve stem, thereby defining a bridge annulus which maintains fluid communication between the primary pressure chamber and the auxiliary pressure chamber at all times. The thrusting force produced by the auxiliary piston is combined with the thrusting force produced by the primary piston to break the static gate seal and overcome the gate drag during a first stage of operation. After breakaway has been accomplished, the auxiliary piston is mechanically decoupled from the valve stem, whereby the valve stem is driven only by the primary piston at a substantially reduced thrusting force level during a second stage of operation, thereby avoiding gate damage which might otherwise occur if the valve stem velocity was not restrained.

17 Claims, 4 Drawing Sheets

DUAL STAGE VALVE ACTUATOR

FIELD OF THE INVENTION

This invention relates to a pneumatic actuator for controlling the operation of a safety valve which is designed to actuate automatically upon loss of control pressure.

BACKGROUND OF THE INVENTION

Formation fluids including oil and gas produced at a wellhead are conveyed through flow lines to remote gathering stations. It is conventional practice to use surface safety valves which are responsive to a number of different changes in operating conditions to automatically shut off flow at the onset of unusual or unscheduled operating conditions. For example, catastrophic failures may occur in which flow lines are broken by explosion, storm damage and the like, creating sudden decreases in flow line pressure. Such safety valve installations are designed to automatically close in response to flow line fluctuations either above or below predetermined settings, such as high and low liquid levels, high and low temperatures, and electrical power loss. Conventional safety valves adapted for surface flow line installation are described and illustrated in the *Composite Catalog of Oilfield Equipment and Services*, published by World Oil, Houston, Tex.

DESCRIPTION OF THE PRIOR ART

Conventional safety valves which are commonly used in oil and gas flow systems include a pneumatic or hydraulic actuator coupled to a gate for opening and closing the safety valve. Surface safety valves are installed as a secondary master valve on a wellhead tree, as a wing valve, in flow lines, on header valves, gathering lines and cross country pipelines. In pilot assisted forms of such safety valves, the actuator as well as the gate member operate in response to the pressure of the fluid being controlled so that a sudden, substantial pressure drop in the flow line at the safety valve will result in closing the gate.

In another form of surface safety valves, an independent source of control fluid pressure, either pneumatic or hydraulic, is applied to the actuator in response to sensing a condition such as flow line pressure changes. Such remotely controllable safety valves are useful for controlling production flow from wells which are located in relatively inaccessible locations.

One type of remotely controllable surface safety valve includes a pneumatic actuator that is operated by a closed pneumatic supply which is independent of well fluids and pressures. The pneumatic surface safety valve is designed to be held open by pneumatic control pressure acting on an actuator piston. Loss of pneumatic pressure in the actuator cylinder permits the well or flow line pressure, acting on the gate and the lower stem, together with the force exerted by a closing spring, to drive the gate into a valve closed position.

The high gate sealing forces developed in a single stem valve requires a powerful actuator thrust to break the static gate seal and overcome the drag forces. When uncontrolled, such a powerful thrust can seriously damage the valve components, such as the seal rings, the gate and gate coupling members. The handling of high production flow pressures of 10,000–15,000 psi or more, which is characteristic of deep gas and oil wells, increases the gate seal requirements and the actuator thrust must be correspondingly increased to break the static seal. Consequently, in such cases it may be desirable to use a hydraulic actuator to provide such powerful thrust forces. However, pneumatic actuators are sometimes preferred for use in very high pressure systems where quick response times are needed, or where avoidance of the flammability hazard is important, and where pneumatic control power is readily available.

In single stem gate valves, the piston diameter must be sized so that it is able to develop sufficient thrust force upon application of available control fluid pressure to break the static seal and overcome the gate drag plus the opposition of the return spring and the flow line pressure which acts against the lower stem to oppose stem movement After those forces have been overcome by displacement of the valve stem through a short stroke distance, the valve body cavity is vented to the flow passage. As this happens, both the gate drag and the opposing stem force diminish rapidly, and stem movement is opposed only by the return spring.

If the actuator control fluid is hydraulic, the gate and actuator piston will stroke at a limited speed determined by the flow rate of the actuator pressure source fluid and the actuator orifice inlet. However, in applications where pneumatic actuators are used to control the operation of the gate valve, a high pneumatic pressure is applied across the piston to break the static seal and overcome the gate drag. When breakaway occurs, the high pressure pneumatic control fluid expands rapidly, thereby driving the piston with great force. Accordingly, in a conventional pneumatic actuator, the piston, stem and gate are moved with a much greater velocity as compared to the stem velocity of a hydraulic actuator Consequently, upon loss of gate drag, the actuator piston, stem and valve gate are driven with great velocity and momentum If stem velocity is unrestrained under such circumstances, the gate will slam against the valve stop, which increases the likelihood of valve damage.

The "slam" effect has been avoided or minimized in single stem pneumatic powered actuators by a hydraulic choke. However, a hydraulic choke increases the number of components and the complexity of the actuator In other single stem, pneumatic powered actuators, the slam effect is avoided by restricting the flow of actuating fluid to the actuating piston at the critical time during the actuator stroke when the valve gate port first opens in communication with the flow passage through the safety valve, thereby limiting the actuator stem velocity.

Examples of prior art surface safety valve constructions are disclosed in the following U.S. Patents:

| | | | |
|---|---|---|---|
| 2,566,772 | 2,566,773 | 2,566,775 | 2,566,776 |
| 2,588,284 | 2,693,819 | 3,232,174 | 3,958,592 |
| 3,993,284 | 4,087,073 | 4,153,072 | 4,199,131 |
| 4,240,463 | 4,274,432 | 4,529,330 | 4,838,243 |

OBJECTS OF THE INVENTION

A general object of the present invention is to provide an improved pneumatic actuator which is operable under high production pressure conditions to close a safety valve quickly upon loss of control pressure without causing damage to the valve or to the actuator A related object of the invention is to provide an improved pneumatic actuator of the character described which is capable of developing high breakaway thrust forces from available low pressure pneumatic control fluid so that a safety valve can be opened quickly under high pressure conditions without causing damage to the valve or to the actuator.

Another object of the invention is to simplify the construction and improve operational reliability of pneumatic actuators for use in combination with surface safety valves.

Yet another object of the invention is to provide improved means for limiting stem velocity during gate opening movement in a pneumatic actuator of the character described, whereby the "slam" effect is avoided.

Still another object of the invention is to provide improved means for limiting stem velocity during gate closing movement to avoid damage to the actuator components as the gate and stem retract against a valve stop.

SUMMARY OF THE INVENTION

A dual stage pneumatic actuator for actuating the gate assembly of a surface safety valve utilizes an auxiliary piston and a primary piston which act in unison against the valve stem during a first stage of operation, in which gate breakaway forces are overcome, and in a second stage of operation in which the driving force developed by the auxiliary piston is decoupled from the valve stem after breakaway has occurred. The auxiliary piston is slideably coupled to the valve stem, and is mechanically linked to the primary piston during the first stage so that the thrusting forces developed by the auxiliary piston are combined with the thrusting force developed by the primary piston. After traveling through an initial stroke distance, the auxiliary piston engages a fixed divider plate, thereby permitting disengagement of the primary piston from the auxiliary piston. In the preferred embodiment, the mechanical coupling of the auxiliary piston to the primary piston is provided by a shuttle sleeve. The shuttle sleeve provides mechanical coupling of the auxiliary piston to the valve stem during the first stage, and simultaneously provides fluid communication from the auxiliary pressure chamber across the divider plate and into the primary pressure chamber at all times during opening and closing operations.

The foregoing and other features, characteristics, advantages, and the invention in general, will be better understood from the following detailed description taken in conjunction with the accompanying drawings in which:

DETAILED DESCRIPTION OF THE PREFERRED EMBODIMENT

Figure 1:
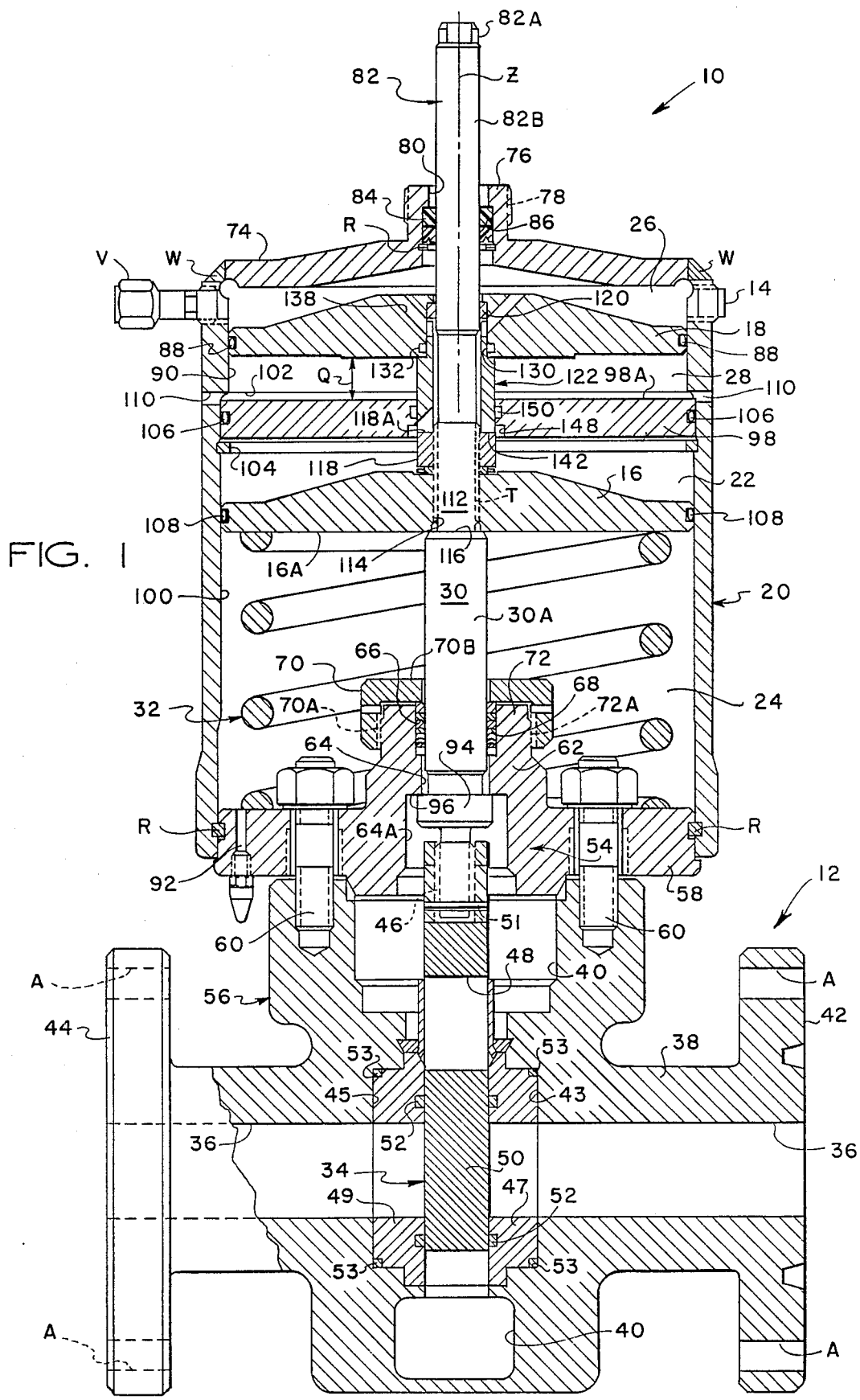
FIG. 1 is an elevation view, partly in section, of a dual stage pneumatic actuator assembled onto a surface safety valve, as shown in the gate-closed position.

In the description which follows, like parts are indicated throughout the specification and drawings with the same reference numerals, respectively. The drawings are not necessarily to scale and the proportions of certain parts have been exaggerated to better illustrate details of the invention.

Figure 2:
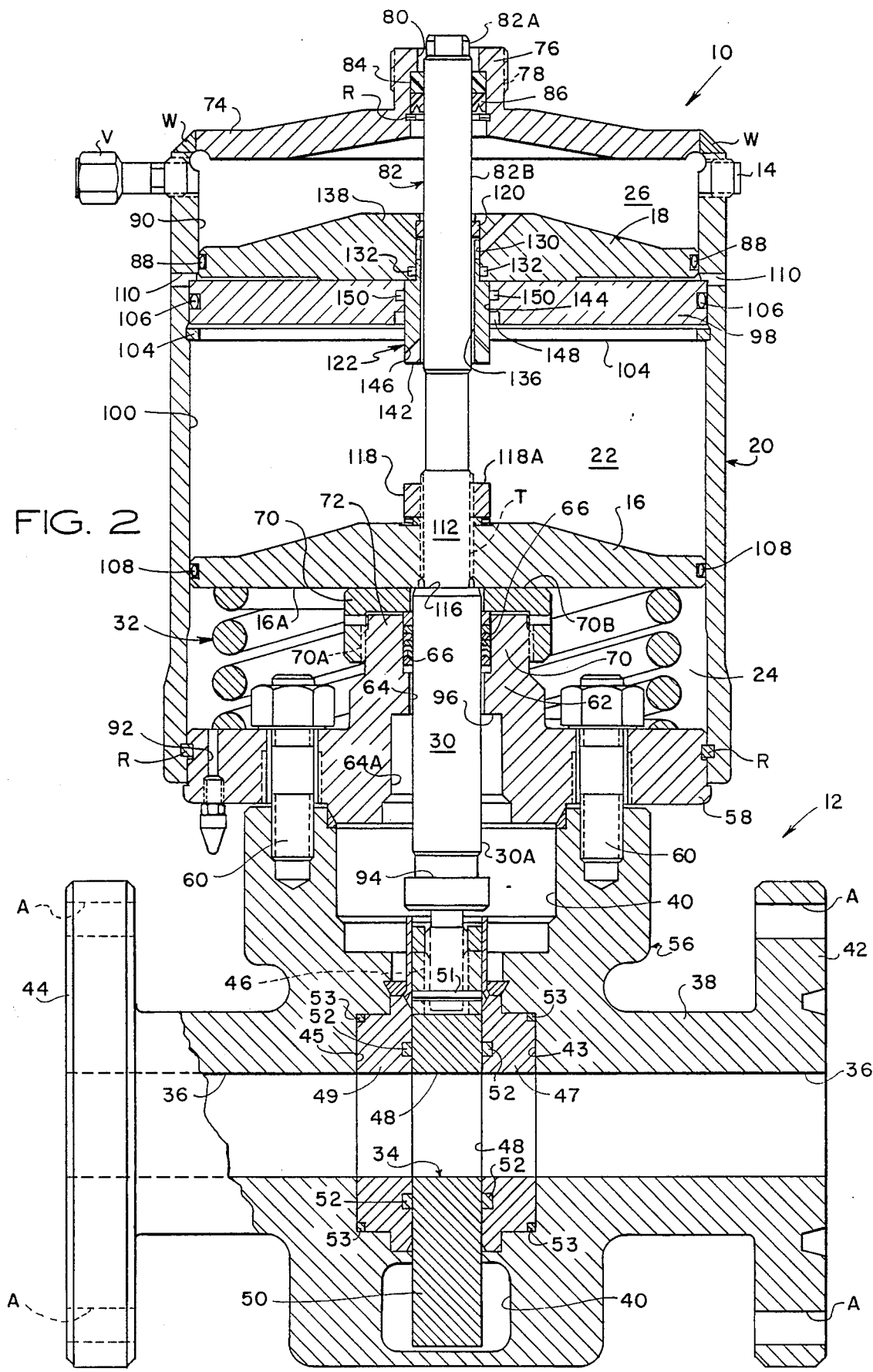
FIG. 2 is an elevation view, partly in section, of the dual stage pneumatic actuator in the gate-open position.

Referring now to FIG. 1 and FIG. 2 of the drawings, a pneumatic actuator 10 is assembled onto a safety valve 12 which is designed for controlling the transmission of fluids through a flow line from a source, such as a wellhead, to a remote storage tank. The safety valve 12 is adapted for connection into the flow line adjacent the well for shutting off flow through the flow line at the well in the event that the pressure in the flow line downstream of the safety valve exceeds a predetermined maximum value or falls below a predetermined lower minimum value. The actuator 10 is designed to close the safety valve 12 quickly upon loss of control pressure which is applied to the pneumatic actuator through an inlet port 14.

The pneumatic actuator 10 is energized by a closed pneumatic system which is operable completely independent of flow line pressures The safety valve 12 is initially opened by pneumatic pressure acting on a primary piston 16 and an auxiliary piston 18, and is driven to the fully open position by pressure acting on the primary piston 16 alone as discussed below.

The pistons 16, 18 are housed within a power cylinder 20 which encloses a master actuator chamber which is partitioned by piston and divider plate means into four variable volume service chambers: a primary pressure chamber 22, a primary exhaust chamber 24, an auxiliary pressure chamber 26 and an auxiliary exhaust chamber 28. Loss of pneumatic pressure within the pressure chambers 22, 26 permits flow line pressure acting on a gate stem 30 in combination with a bias force exerted by a closing spring 32 to retract the pistons and move a valve gate 34 to a position which blocks the flow through the safety valve bore 36 (FIG. 1).

According to this arrangement, the safety valve 12 can be installed adjacent to a well head, and is controllable from a location remote from the well by the application of pneumatic control pressure through the inlet port 14 into the primary and auxiliary pressure chambers 24, 26.

The bore 36 of the safety valve 12 provides a longitudinal flow passage for connection into a production flow line. The safety valve 12 includes a body portion 38 through which the longitudinal bore 36 is formed, and in which a gate cavity 40 is formed. The valve body may be securely coupled to flow line sections by connector bolts or studs which are extended for bolted connection through aligned apertures A in flanges 42, 44 for bolted connection of the valve into a flanged flow line, wellhead or other flanged structure through which pressurized fluid is to flow.

Seat recesses 43, 45 are formed internally of the valve body 38 and are adapted to receive valve seat elements 47, 49, respectively. The valve seats 47, 49 have annular grooves formed on their gate valve facing surfaces for receiving the annular face seal rings 52, while the opposite side surfaces of each sealing element receives rear sealing elements 53, respectively. The sealing elements 52, 53 may be formed of any one of a number of suitable sealing materials, for example, polytetrafluoroethylene, depending upon the type and characteristics of the fluid to be controlled. Although the gate element 50 of the safety valve is shown as a slab gate, it is not intended that the present invention be limited to the use of slab gates. The actuator 10 may be used in combination with expanding gates and other gate apparatus without departing from the spirit and scope of the present invention.

Connection between the gate 34 and the valve stem 30 is accomplished by the threaded coupling 46 which is secured against release by a connection pin 51.

The gate cavity 40 intersects the longitudinal flow passage 36. The valve gate 34 is slideably received within the gate cavity 40 and is coupled to the valve stem 30 by a threaded coupling 46. The valve gate 34 includes an aperture 48 which is illustrated (FIG. 2) in bore alignment with the longitudinal flow passage 36 of the safety valve. The position of the gate and pistons as illustrated in FIG. 2 corresponds with the pistons 16, 18 being in their extended, seated positions, with the pressure chambers 22, 26 being fully charged with pneumatic (air) control pressure, for example 100 psi.

It is apparent that the valve 12 will remain in the valve open position as long as pneumatic pressure is maintained within the primary pressure chamber 22. The return spring 32 will remain compressed as shown in FIG. 2 as long as the primary pressure chamber 22 is pressurized. In the event pneumatic control pressure is interrupted for some reason, for example in response to operator control, or by failure of the pneumatic supply system, or in response to the detection of an unscheduled operating condition such as a sudden decrease or increase in flow line pressure, the return spring 32 will drive the primary piston 16 upwardly and outwardly, thus moving the valve stem 30 and gate 34 toward the closed position (FIG. 1). Full outward movement of the valve stem 30 will move the gate aperture 48 into registration with the flow passage 36.

Upon release of pressure from the pressure chambers 22, 26, the pistons 16, 18 are retracted into their pressure chambers in response to the closing force applied by the return spring 32, together with the pressure developed by flow line fluid entering the gate cavity 40 and being applied against transverse surfaces of the valve stem 30. According to this arrangement, flow line fluids accumulate within the gate cavity 40, rather than being discharged into the surrounding atmosphere. The gate 34 includes a solid slab portion 50 which engages an annular sealing ring 52 for blocking flow through safety valve bore 36 as the pistons 16, 18 are fully retracted. The closing spring 30 is designed to retract the pistons 16, 18 and gate 34 independently of flow line pressure in the safety valve bore 36.

The pneumatic actuator 10 includes a bonnet 54 for coupling the actuator onto the safety valve 12. The safety valve body 38 has a coupling collar 56 aligned with the gate cavity 40 for engaging the bonnet 54. The bonnet 54 is provided with an annular flange 58 which is secured onto the coupling collar 56 by threaded bolt connectors 60.

The bonnet 54 has a body portion 62 through which a smooth bore 64 is formed. The valve stem 30 has a polished, cylindrical surface 30A which extends through the bonnet bore 64 and bears in sealing engagement against a static annular packing seal 66. The bonnet bore 64 is enlarged by a polished counterbore 68, and the annular packing seal 66 is received within the polished counterbore 68 as a static seal assembly The static seal assembly 66 is retained within the polished counterbore 68 by a threaded packing collar 70. The bonnet body 62 has an annular shoulder 72 which is concentric with the bonnet bore 64. The bonnet shoulder 72 has external threads 72A and the packing collar 70 has mating internal threads 70A. After the packing seal 66 has been inserted in the polished bore 68, the packing collar 70 is screwed into the threaded shoulder 72, thereby retaining the packing seal 68 within the smooth counterbore 68. Engagement of the packing seal 66 against the polished external surface 30A of the valve stem 30 produces a fluid seal to prevent exposure of the actuator internal components to flow line fluids which accumulate within the gate cavity 40.

The lower end of the actuator cylinder 20 is fastened onto the bonnet flange 58 by a carbon steel wire ring retainer R. According to this arrangement, the actuator 10 is supported in an upright orientation with respect to the safety valve 12, with the valve stem 30 being positioned in alignment with the gate closure member 34.

The upper end of the actuator cylinder 18 is sealed by a top plate 74 which is attached to the cylinder by an annular weld bead W. The top plate 74 has an axially projecting central shoulder 76 which is fitted with external threads 78 for engaging a hold-down cap (not shown). A bore 80 extends axially through the shoulder 76 and is centered about the longitudinal axis Z of the valve stem 30. The valve stem 30 includes an indicator stem 82 which projects through the top plate bore 80 for providing an indication of the safety valve operating mode. The indicator stem 82 extends axially through the pressure chamber 26 and provides a smooth, cylindrical surface along which the auxiliary piston 18 is slideably mounted. In the preferred embodiment, the indicator stem 82 is integrally formed with the valve stem 30.

In the valve open mode, the external end 82A of the indicator stem 82 is barely visible, but when the safety valve has been actuated to the valve closed position, the polished external surface 82B of the indicator stem 82 will project substantially above the cap 66, as shown in FIG. 1, to indicate and verify the closed position of the gate. Flats are machined on the external end portion 82A for engagement by a wrench to prevent the stem from turning during assembly.

The indicator stem 82 has a cylindrical, external polished surface 82B which engages in sealing relation with an annular packing assembly 84. Preferably, the annular packing assembly 84 comprises an elastomeric seal ring supported axially by a polymer backup ring. The seal 84 is received within a polished counterbore 86 which is concentric with the top plate bore 80. The packing 84 is retained within the counterbore 86 by a metal spiral ring R.

The external cylindrical surface 82B of the indicator stem 82 is smoothed and polished to produce a finish of 32 RMS, and since the packing assembly is static, the counterbore 86A is polished to a 63 RMS finish. The engagement of the polished external cylindrical surface 82B of the indicator stem 82 against the packing assembly 84 seals the interface between the indicator stem 82 and the shoulder 76, thereby sealing the upper end of the auxiliary pressure chamber 26. The lower boundary of the auxiliary pressure chamber 26 is variable according to the axial position of the auxiliary piston 18 and is sealed by a slideable annular seal 88 mounted about the cylindrical sidewall of auxiliary piston 18.

The portion of power cylinder 20 which is coincident with the auxiliary pressure chamber 26 has a polished internal cylindrical bore surface 90 which is honed to a 32 RMS finish. The slideable, sealing engagement of the auxiliary piston seal 88 against the polished internal bore surface 90 provides a secure dynamic seal along the lower boundary of the variable volume auxiliary pressure chamber 26.

The closing spring 32 is confined between the bonnet flange 58 and the lower face 16A of the primary piston 16. The closing spring 32 is enclosed within the unpressurized primary exhaust chamber 24 within the pressure cylinder 20. The primary exhaust chamber 24 is relieved to atmospheric pressure by a vent bore 92 formed through the bonnet flange 58.

The slab element 50 of the gate assembly 34 is connected at its upper end to the lower end of the valve stem 30 which extends through the bonnet bore 64 and into the upper gate cavity 40. The valve stem 30 is connected to the gate slab 50 so that upon displacement of the stem along the axis Z, the gate slab 50 is movable across the flow passage 36 between a first position wherein the valve is closed (FIG. 1) to a second position where the valve is open (FIG. 2). Downward opening movement of the valve stem 30 is opposed by the return spring 32, and is limited by engagement of the lower face 16A of the primary piston 16 against the top annular face 70B of the packing collar 70, as shown in FIG. 2. By this arrangement, travel of the gate slab 50 is stopped as the gate assembly is driven to the valve open position as shown in FIG. 2. Retraction movement of the valve stem 30 is stopped by engagement of a valve stem shoulder 94 against an annular shoulder stop 96 formed in concentric alignment with the bonnet bore 64. The bonnet bore 64 is enlarged by a counterbore 64A through which the valve stem shoulder stop 94 is extended and retracted.

According to an important feature of the invention, the auxiliary piston 18 is slideably coupled in sealing engagement against the polished cylindrical surface 82B of the indicator stem 82. Moreover, downward displacement of the auxiliary piston 18 is limited during opening movement of the actuator stem 30 by a divider plate 98 which is interposed between the auxiliary exhaust chamber 28 and the primary pressure chamber 22. The power cylinder bore 90 is enlarged by a polished counterbore 100, thereby defining a radially inset shoulder 102 (FIG. 1) which confines the top surface 98A of the divider plate. The divider plate 98 is confined against downward displacement by a retainer ring 104 and is sealed against the polisher power cylinder counterbore 100 by an annular seal ring 106.

The divider plate 98 subdivides the master actuator chamber enclosed by the power cylinder 20 into a primary actuator chamber and an auxiliary actuator chamber. The primary actuator chamber is further subdivided by the primary piston 16 into the primary pressure chamber 22 and the primary exhaust chamber 24. Likewise, the auxiliary actuator chamber is further subdivided by the auxiliary piston 18 into the auxiliary pressure chamber 26 and auxiliary exhaust chamber 28.

Engagement of the divider plate seal ring 106 against the polished counterbore 100 defines the upper boundary of the variable volume primary pressure chamber 22. The lower boundary of the primary pressure chamber 22 is defined by the axial position of the primary piston 16. The lower boundary of the primary pressure chamber 22 is sealed by a slideable annular seal 108 which is mounted about the cylindrical sidewall of the primary piston 16. The slideable, sealing engagement of the primary piston seal 108 against the polished internal bore surface 100 provides a secure seal along the lower boundary of the variable volume primary pressure chamber 22.

The auxiliary exhaust chamber 28 is vented to atmospheric pressure by a vent bore 110 which radially intersects the power cylinder sidewall immediately above the divider plate 98 and just below the radially inset shoulder 102. High pressure relief for the auxiliary and primary pressure chambers 26, 28 is provided by a relief valve V which limits the pneumatic control pressure buildup to a safe level.

The primary piston 16 is rigidly attached to the valve stem 30 by a threaded union T. The threaded union T is defined by external threads formed on an intermediate coupling section 112 of the valve stem 30, and by internal threads formed onto a coupling bore 114 which intersects the primary piston 16 in coaxial alignment with the valve stem axis Z. During assembly, the return spring 32 is confined between the primary piston 16 and the annular coupling flange 58. During assembly, the piston 16 is turned manually on the stem 30 to cause the primary piston 16 to advance along the threaded section of the valve stem 30, thereby pre-loading the return spring 32 to a desired loading level. After the piston 16 has been turned to the limit of its travel, it is stopped by engagement of its lower face 16A against a radially inset shoulder portion 116 which forms a stepped transition between the valve stem 30 and the threaded coupling section 112. The threaded union T of the primary piston 16 onto the valve stem 30 is secured by a jam nut 118.

It will be understood that the primary piston 16 is fixed onto the valve stem 30, whereas the auxiliary piston 18 is slideably mounted onto the polished indicator stem section 82 of the valve stem 30. Accordingly, the auxiliary piston 18 is adapted for independent axial displacement relative to the valve stem 30 and relative to the primary piston 16. Since a powerful breakaway thrust is required for overcoming the high gate sealing forces, the stem shifting force developed by the auxiliary piston 18 is added to the valve stem shifting force produced by the primary piston 16 only through a limited travel distance Q (FIG. 1) during the initial opening displacement of the valve stem 30.

That is, during the initial opening displacement when the breakaway thrust requirement is greatest, the auxiliary piston 18 acts in concert with the primary piston 16, with the thrust force produced by the auxiliary piston 18 being transmitted to the valve stem 30 in combination with the thrusting force developed by the primary piston 16. However, after the static seal and gate drag forces have been overcome by displacement of the valve stem 30 through a short stroke distance, corresponding generally with the predetermined axial travel distance Q, the gate drag forces diminish rapidly, and the valve stem movement is opposed only by the return spring and the flow line pressure acting against the lower stem.

To prevent the "slam" effect which would otherwise occur after breakaway has been achieved, the effective driving force applied to the valve stem 30 is substantially reduced (by approximately 50 percent) by mechanically decoupling the auxiliary piston 18 with respect to the valve stem 30. Displacement of the auxiliary piston 18 more than the breakaway displacement distance Q is prevented by engagement of the auxiliary piston 18 against the divider plate 98. The auxiliary piston 18 is slideably guided along the polished external surface 82B of the indicator stem 82 by an annular bearing ring 120. Accordingly, the valve stem 30 continues to be driven downwardly after breakaway occurs, but at a substantially reduced thrusting force which is produced only by the primary piston 16.

The thrusting force developed by the primary piston 16 is yieldably opposed by the return spring 32, which permits the gate 34 to open quickly, but without slamming the piston 16 against the packing collar 70. The amount of thrusting force reduction obtained upon mechanical decoupling is determined by the ratio of the effective piston areas. In the arrangement of FIGS. 1 and 2, the auxiliary piston 18 effective area is approximately 97 percent of the primary piston effective area. Accordingly, a driving force reduction of approximately 4 percent is obtained in the illustrated example by mechanically decoupling the auxiliary piston 18 after breakaway forces have been overcome.

Accordingly, the gate assembly 34 is opened in a two stage operation. During the first stage, the thrusting force developed by the auxiliary piston 18 is combined directly with the thrusting force produced by the primary piston 16 to break the static gate seal and overcome the drag forces. In the second stage, after the onset of breakaway, the thrusting force required to drive the gate assembly 34 to the gate open position (FIG. 2) is substantially reduced. Accordingly, during the second stage operation, the auxiliary piston 18 is mechanically decoupled from the valve stem 30 by stop engagement against the divider plate 98, with the valve stem thereafter being driven only by the primary piston 16 until its displacement is stopped by engagement against the packing collar 70.

Referring again to FIG. 1, the auxiliary piston 18 is mechanically coupled to the valve stem 30 by a cylindrical shuttle sleeve 122. The shuttle sleeve 122 mechanically couples the thrusting force developed by the auxiliary piston 18 to the valve stem 30, while simultaneously providing fluid communication from the auxiliary pressure chamber 26 across the divider plate 98 and into the primary pressure chamber 22.

Figure 3:
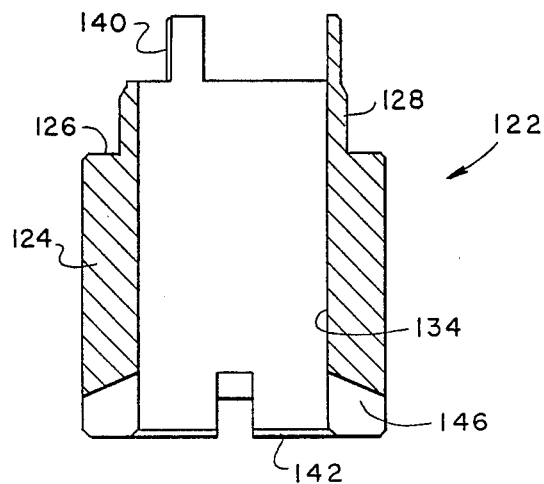
FIG. 3 is a longitudinal sectional view of a bypass sleeve which forms a part of the dual stage actuator shown in FIGS. 1 and 2.
Figure 4:
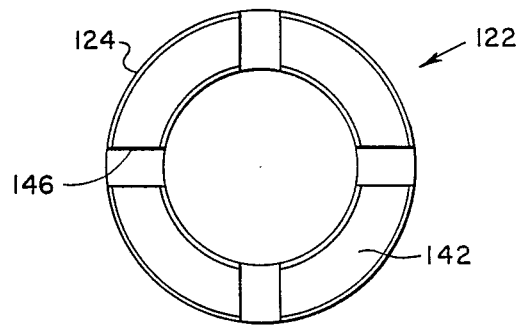
FIG. 4 is a bottom plan view of the bypass sleeve.
Figure 5:
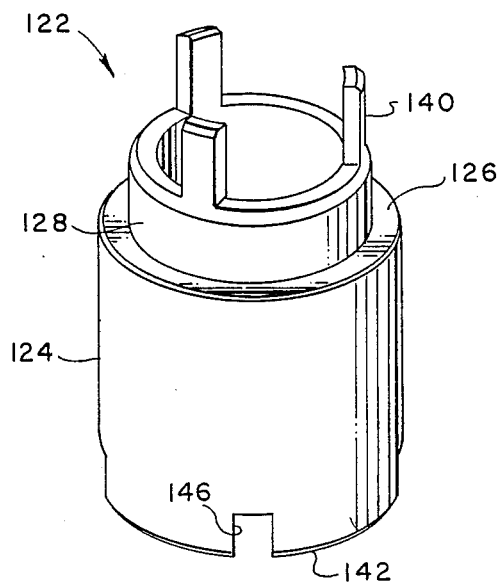
FIG. 5 is a perspective view thereof.

Referring to FIGS. 3, 4 and 5, the thrust transmission function is provided by a cylindrical sidewall 124 which has a radially inset shoulder 126 and a cylindrical crown member 128. The auxiliary piston 18 has a cylindrical counterbore 130 in which the backup guide ring 120 is received. The crown 128 of the shuttle sleeve 124 is inserted into the counterbore 130, and the interface between the counterbore 130 and the crown 128 is sealed by an O-ring 132.

The diameter of the inside bore 134 of the shuttle sleeve sidewall 124 is larger than the outside diameter of the indicator sleeve 82. Accordingly, an annular flow passage 136 is defined between the overlapping portions of the shuttle sleeve sidewall 124 and the indicator stem 82. The cylindrical annulus 136 provides a fluid communication "bridge" passage between the auxiliary pressure chamber 26 and the primary pressure chamber 22 during valve opening and closing operations.

Referring again to FIGS. 1 and 2, it will be noted that the shuttle sleeve 122 also provides a mechanical bridge which bypasses the divider plate 98. According to this bridge arrangement, the shuttle sleeve 122 transmits the thrusting force produced by the auxiliary piston 18 directly into the primary piston 16 during its initial travel through the breakaway distance Q. Fluid communication between the auxiliary pressure chamber 26 and the cylindrical annulus 136 is provided by a drill bore 138 which transversely intersects the auxiliary piston 18 and opens into the counterbore 130.

The crown 128 of shuttle sleeve 122 is inserted into the counterbore 130 and is received in tight, static engagement against the O-ring seal 132. The crown portion 128 includes a plurality of axially projecting, angularly spaced fingers 140 which retain the backup bearing ring 120 within the counterbore 130, and prevent it from blocking the transverse drill bore 138. Preferably, the auxiliary piston 18 is intersected by four transverse drill bores 138, with adjacent drill bores being angularly separated with respect to each other by 90 degrees.

Figure 6:
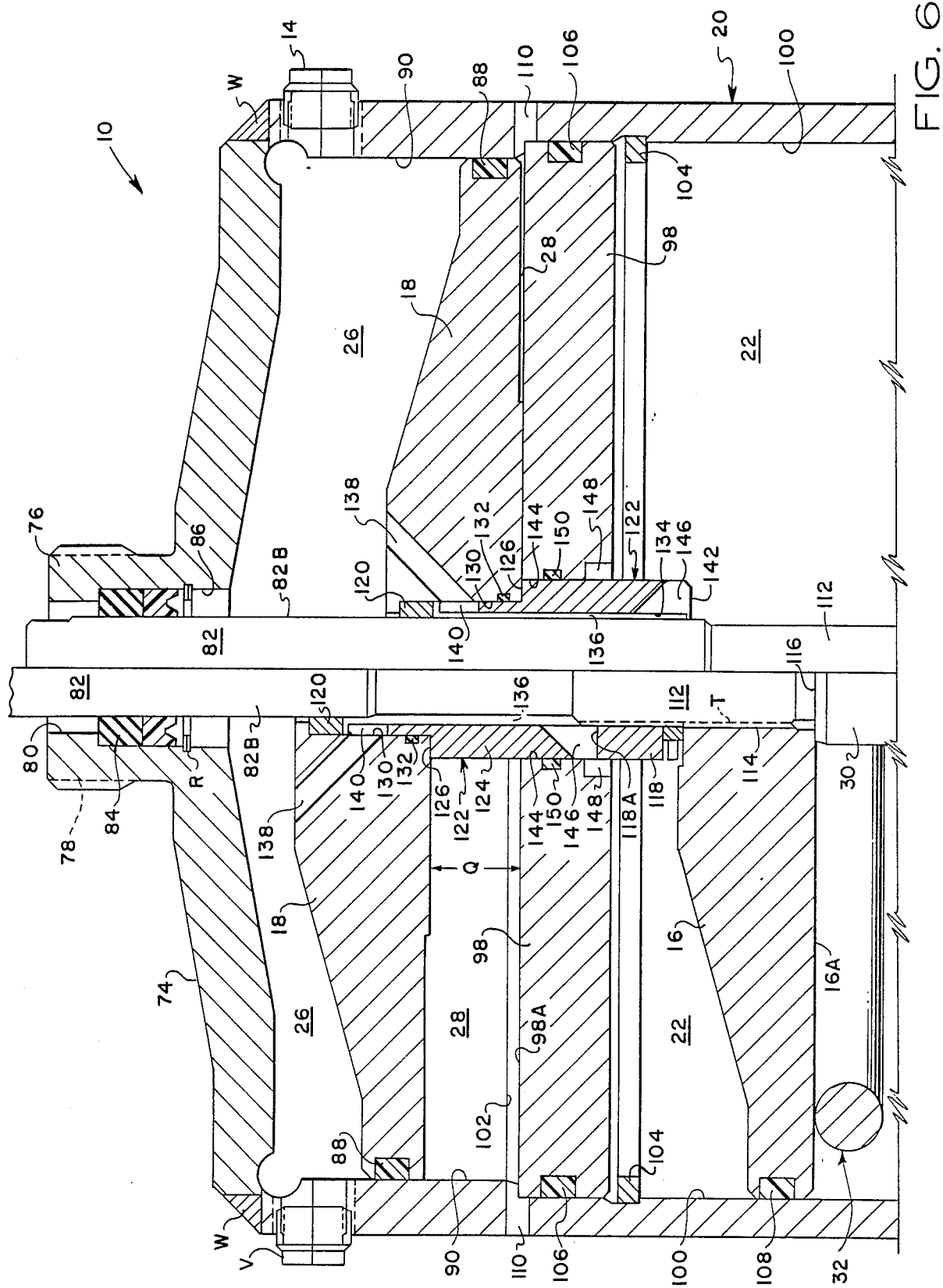
FIG. 6 is a split longitudinal sectional view of the dual stage actuator of the invention, with the left and right split sections being shown in valve closed and valve open positions, respectively.

The thrusting force produced by the auxiliary piston 18 is transmitted through the shuttle sleeve 122 by the engagement of the auxiliary piston 18 against the annular face of the radially inset shoulder 126. Thrusting forces produced by the auxiliary piston 18 are transmitted through the cylindrical sidewall 124 of the shuttle sleeve to the valve stem 30 through the jam nut 118 and primary piston 16. The shuttle sleeve sidewall 124 has a lower force transmitting base member 142 which is engagable against the top planar surface 118A of the jam nut as illustrated in FIG. 6.

According to this arrangement, the shuttle sleeve 122 is releasably coupled in force transmitting engagement with the primary piston 16 and valve stem 30 during the initial stroke displacement Q. Upon completion of the stroke displacement Q, the auxiliary thrusting force is decoupled from the valve stem by engagement of the auxiliary piston 18 against the divider plate 98.

Referring again to FIG. 6, the lower sidewall 124 of the shuttle sleeve 122 is slideably received in sealing engagement against a central bore 144 formed in the divider plate 98. Fluid communication between the annulus 136 and the primary pressure chamber 22 is provided by a plurality of transverse slots 146 formed in the shuttle sleeve sidewall 124 and by a counterbore 148 formed in the divider plate 98. The interface between the divider plate bore 144 and the cylindrical sidewall 124 of the shuttle sleeve is sealed by an O-ring seal 150. According to this arrangement, the bridge annulus 136 is sealed with respect to the auxiliary exhaust chamber 28, and the primary pressure chamber 22 is sealed with respect to the auxiliary exhaust chamber during extension and retraction of the valve stem 30, while maintaining open fluid communication between the auxiliary pressure 26 chamber and the primary pressure chamber 22 at all times.

According to the foregoing arrangement, the shuttle sleeve 122 travels with the auxiliary piston 18 during extension and retraction only through the breakaway travel distance Q. During the initial movement, the external surface of the cylindrical sidewall 124 slides against the O-ring seal 150 as the shuttle sleeve is displaced axially through the divider plate bore 146. After downward displacement of the auxiliary piston 18 has been stopped, the valve stem 30 continues to be displaced downwardly by the thrusting force developed by the primary piston 16, until the gate aperture 48 is in flow passage alignment with the safety valve bore 36 (FIG. 2).

The valve stem is driven by both primary and auxiliary pistons through the initial breakaway travel distance Q, and the valve stem 30 is driven only by the primary piston, at a substantially reduced thrusting force level, after breakaway has been accomplished.

Because the auxiliary piston 18 is decoupled with respect to the valve stem 30 after breakaway occurs, the primary piston 16 is driven by a substantially reduced thrusting force which is produced solely by the primary piston, thereby avoiding damage to the gate valve components which might otherwise occur should the piston 16 continue to be driven by both primary and auxiliary pistons after the breakaway forces have been overcome.

Instead, the valve stem and gate valve components are driven downwardly only by the primary piston 16 after downward movement of the auxiliary piston 18 has been stopped by engagement against the divider plate 98. The primary piston 16 is sized appropriately to overcome the yieldable bias force imposed by the return spring 32, based upon the available pneumatic control pressure. Because of the continuous fluid communication established by the shuttle annulus 136, the primary pressure chamber 22 and the auxiliary pressure chamber 26 ar pressurized to the same level during a gate open operation.

During axial displacement of the auxiliary piston 18 through the breakaway travel distance Q, the auxiliary piston 18 moves in concert with the primary piston 16, with the shuttle sleeve 122 being held in compression between the jam nut 118 and the auxiliary piston 18. However, upon engagement of the auxiliary piston 18 against the divider plate 98, engagement of the auxiliary piston is released. The primary piston 16 continues its retraction movement as it drives the valve stem 30 downwardly until it is stopped by engagement against the packing collar 70. During this time, the crown 128 of the shuttle sleeve 122 remains inserted within the auxiliary piston bore 130, and the sidewall 124 remains in sealing engagement against the O-ring seal 150 of the divider plate 98.

The actuator 10 is intended to be powered by a closed pneumatic supply which is independent of well fluids and pressures. The gate 34 is maintained in the open position (FIG. 2) by applying pneumatic control pressure, for example 100 psi, through the inlet port 14, thereby pressurizing the auxiliary and primary pressure chambers 26, 22 to 100 psi. When the primary piston 16 is driven to the fully retracted position as shown in FIG. 2, the energy stored in the return spring 32 is sufficient to quickly extend the valve stem 30 and retract the gate 34 to the closed position as shown in FIG. 1 upon loss of pneumatic control pressure. The force exerted by the closing spring 32, together with the flow line pressure acting on the gate components and lower stem, drive the gate slab 50 to the valve closed position (FIG. 1).

The valve stem velocity is also limited during a gate closing operation to avoid damage to the actuator components as the valve stem shoulder 94 retracts against the bonnet shoulder stop 96. The velocity of the valve stem 30 is limited by the throttling of compressed air from the primary pressure chamber 22 through the restricted flow passage provided by the shuttle annulus 136. The flow restriction provided by the shuttle annulus 136 produces momentary compression within the primary pressure chamber 22 which yieldably opposes the force being exerted by the return spring 32.

During the gate closing operation, the pressure in the primary pressure chamber 22 is initially equalized with the pneumatic pressure in the auxiliary pressure chamber 26, so that the net pneumatic pressure differential force acting on the shuttle sleeve 122 is zero. Accordingly, the shuttle sleeve 122 remains inserted within the primary piston bore 130 at all times. Upon loss of pneumatic pressure in the auxiliary pressure chamber 26, a pressure differential initially arises, thereby tending to drive the shuttle sleeve 122 against the auxiliary piston 18. Accordingly, it is not necessary to fasten the shuttle sleeve 122 onto the auxiliary piston.

As the valve stem is being extended during a valve closing operation, the primary piston 16 is driven upwardly into engagement with the lower annular face 142 of the shuttle sleeve 122. As this occurs, the shuttle sleeve 122 and auxiliary piston 18 are extended through the primary pressure chamber 26 until the valve stem shoulder 94 engages against the bonnet stop 96. As the primary piston moves upwardly, it compresses the air in the primary pressure chamber 22 as the compressed air is throttled through the bridge annulus 136.

If the valve 12 is closing in response to an emergency condition or some other unscheduled event, then it is desirable that the gate 34 be closed quickly with movement of the valve stem 30 being restrained to prevent damage to the gate valve components which might otherwise occur if the valve stem were permitted to slam closed. The momentary compression of the air in the primary pressure chamber 22 during the closing operation yieldably opposes and cushions the closing thrust developed by the return spring 32, thereby avoiding component damage It will be appreciated that the dual stage actuator 10 develops powerful breakaway thrust forces from available pneumatic control pressure without increasing the effective diameter of the actuator. The length of the actuator is increased only slightly, by approximately three inches, to accommodate the auxiliary piston 18. Thus the actuator 10 is a compact, powerful unit which is well adapted for use in applications where space is limited, for example in offshore installations. Moreover, because of the powerful thrust developed by the auxiliary and primary pistons acting in unison, a safety valve can be opened quickly under high production flow pressure conditions, using pneumatic control pressure at relatively low pressure levels (e.g., 100 psi) which is commonly available at well installations. The opening operation can be carried out quickly and safely because the opening thrust forces are substantially reduced by mechanically decoupling the auxiliary piston with respect to the valve stem after breakaway has occurred. The valve stem velocity is also limited upon closing movement by the momentary compression of air in the primary pressure chamber which is achieved by throttling the compressed air through the restricted flow passage area provided by the shuttle annulus.

Although the invention has been described with reference to a specific pneumatic actuator embodiment, and with reference to a particular safety valve application, the foregoing description is not intended to be construed in a limiting sense. Various modifications of the disclosed embodiment as well as alternative applications of the invention will be suggested to persons skilled in the art by the foregoing specification and illustrations. It is therefore contemplated that the appended claims will cover any such modifications or embodiments that fall within the true scope of the invention.

What is claimed is:

1. A valve actuator for use in combination with a fluid flow control valve of the type including a valve body having a fluid flow passage and a valve closure member movable between first and second positions for opening and closing said fluid flow passage, respectively, said valve actuator comprising, in combination:

an actuator housing including a coupling bonnet having a valve stem passage adapted for connection to the valve body and a power cylinder mounted on said bonnet, said power cylinder enclosing an actuator chamber and having an inlet port communicating with said actuator chamber for permitting the flow of control fluid into and out of said actuator chamber;

a valve stem disposed within said housing for extension and retraction through said actuator chamber, said valve stem projecting through said bonnet passage and adapted for attachment to said valve closure member;

a divider plate mounted within said power cylinder thereby dividing said actuator chamber into a primary actuator chamber and an auxiliary actuator chamber, said divider plate having a central bore through which said valve stem projects;

a primary piston disposed in said primary actuator chamber and attached said valve stem extension and retraction therewith, said primary piston dividing said primary actuator chamber into a variable volume primary pressure chamber and a variable volume primary exhaust chamber;

a return spring interposed between said bonnet and said primary piston for yieldably opposing pressurized movement of said primary piston;

an auxiliary piston disposed in said auxiliary actuator chamber and slidably mounted onto said valve stem for extension and retraction relative thereto, said auxiliary piston dividing said auxiliary actuator chamber into a variable volume auxiliary pressure chamber and a variable volume auxiliary exhaust chamber; and, a shuttle sleeve slideably disposed in sealing engagement against said divider plate bore, said shuttle sleeve being radially spaced from said valve stem thereby refining an annular flow passage for establishing fluid communication between the auxiliary pressure chamber and the primary pressure chamber, and said shuttle sleeve being engageable by said primary piston and by said auxiliary piston for transmitting thrust from said auxiliary piston to said primary piston during pressurized movement of said auxiliary piston.

2. A valve actuator as defined in claim 1, said shuttle sleeve having a crown member disposed in sealing engagement against said auxiliary piston, a base member disposed for engagement by said primary piston, and having a tubular sidewall disposed in radially spaced relation about said valve stem thereby connecting said annular flow passage in fluid communication with said primary pressure chamber and with said auxiliary pressure chamber.

3. A valve actuator as defined in claim 1, said auxiliary piston having a drill bore connecting said auxiliary pressure chamber in fluid communication with said annular flow passage.

4. A valve actuator as defined in claim 1, said shuttle sleeve having a tubular sidewall and a slot which intersects said sidewall in fluid communication with said annular flow passage 5. A valve actuator as defined in claim 1, said auxiliary piston having a central bore through which said valve stem projects, including a bearing ring received within said bore for guiding said auxiliary piston along said valve stem.

6. A valve actuator as defined in claim 1, including sealing means disposed between said shuttle sleeve and the bore of said auxiliary piston for sealing said annular flow passage and primary pressure chamber with respect to the auxiliary exhaust chamber.

7. A valve actuator as defined in claim 1, said auxiliary piston having a central bore through which said valve stem projects, said shuttle sleeve having a crown member received within said central bore and being radially spaced with respect to said valve stem.

8. A valve actuator as defined in claim 1, said auxiliary piston having a central bore through which said valve stem projects, including a bearing ring received within said auxiliary piston bore for guiding said auxiliary piston along said valve stem, and said shuttle sleeve having a crown member received in sealing engagement against said auxiliary piston central bore, said crown member including a plurality of axially projecting fingers disposed within said bore for retaining said bearing ring within said auxiliary piston central bore.

9. A valve actuator as defined in claim 1, including sealing means disposed between said divider plate and the bore of said actuator housing for sealing said primary pressure chamber with respect to said auxiliary exhaust chamber.

10. A valve actuator as defined in claim 1, said auxiliary piston having a central bore through which said valve stem projects, said shuttle sleeve having a crown member received within said central bore and being radially spaced with respect to said valve stem, and sealing means disposed between said crown member and the bore of said auxiliary piston for sealing said annular flow passage and primary pressure chamber with respect to said primary exhaust chamber.

11. An actuator for driving a gate assembly between open and closed positions within a valve, said actuator comprising, in combination:

an actuator housing mountable onto said valve body and defining an actuator chamber therewith;

a valve stem disposed within said housing for extension and retraction through said actuator chamber, said valve stem being adapted for attachment to said gate assembly;

a primary piston disposed within said actuator chamber and attached to said valve stem for extension and retraction within said actuator chamber;

an auxiliary piston slideably mounted onto said valve stem for extension and retraction within said actuator chamber;

fluid inlet means provided through said actuator housing and adapted for connection to a source of control fluid whereby pressurized control fluid may be selectively admitted into said actuator chamber on a fluid receiving side of said auxiliary and primary pistons, respectively;

stop means mounted within said actuator chamber for limiting the stroke of said auxiliary piston to a lesser stroke length than the stroke of said primary piston when pressurized control fluid is admitted into said actuator chamber; and, shuttle means slideably coupled to said stop means and engagable by said primary piston and said auxiliary piston for transmitting thrusting force developed by said auxiliary piston to said primary piston during said limited stroke travel, and having flow passage means for maintaining fluid communication between said actuator chamber and the fluid receiving side of said primary piston during extension and retraction of said valve stem.

12. An actuator as defined in claim 11,
said stop means comprising a divider plate mounted within said actuator chamber thereby dividing said actuator chamber into a primary actuator chamber and an auxiliary actuator chamber, said divider plate having a central bore through which said valve stem projects, and including sealing means disposed between said divider plate and said housing for sealing said primary actuator chamber with respect to said auxiliary actuator chamber.

13. An actuator as defined in claim 11, said auxiliary piston having a central bore through which said valve stem projects, said shuttle means comprising:
a tubular sleeve having a crown member received within the central bore of said auxiliary piston and being radially spaced with respect to said valve stem.

14. An actuator as defined in claim 11, said auxiliary piston having a central bore through which said valve stem projects, said shuttle means comprising:
a crown member received within said auxiliary piston bore and disposed in sealing engagement therewith, a base member disposed for engagement by said primary piston, and having a tubular sidewall disposed in radially spaced relation about said valve stem thereby defining an annular flow passage connecting said primary pressure chamber in fluid communication with said auxiliary pressure chamber.

15. In a valve actuator of the type having a housing mountable onto a valve body, an actuator chamber defined within said housing, a valve stem received within said chamber and extendable cut of said housing for driving a gate assembly, and having a primary drive piston slideably disposed in sealing engagement against said actuator housing and attached to said actuator stem for driving said stem in response to the introduction of pressurized control fluid into said actuator chamber on the fluid receiving side of said drive piston, the improvement comprising, in combination:

an auxiliary drive piston disposed within said actuator chamber and sldeably mounted onto said valve stem;
stop means mounted within said actuator chamber intermediate said primary drive piston and said auxiliary piston and engagable by said auxiliary drive piston for limiting the length of the auxiliary drive piston stroke to a lesser stroke length than that of the primary drive piston stroke when pressurized control fluid is admitted into said actuator chamber; and,
shuttle means disposed in slideable engagement with said stop means, said shuttle means being engageable by said primary drive piston and said auxiliary drive piston during initial travel of said auxiliary drive piston through a predetermined stroke distance and being disengageable from said auxiliary drive piston upon completion of travel by said auxiliary drive piston through said predetermined stroke distance, and said shuttle means having a flow passage for maintaining fluid communication between said actuator chamber and the fluid receiving side of said primary piston.

16. An improved valve actuator as defined in claim 15,
said stop means comprising a divider plate disposed within said actuator chamber thereby dividing said actuator chamber into a primary actuator chamber and an auxiliary actuator chamber, said divider plate having a central bore through which said valve stem projects; and,
said shuttle means comprising a shuttle sleeve slideably disposed in sealing engagement against said divider plate bore, said shuttle sleeve being radially spaced from said valve stem thereby defining an annular flow passage connecting said primary pressure chamber in fluid communication with said auxiliary pressure chamber.

17. An improved valve actuator as defined in claim 15, said auxiliary piston having a central bore through which said valve stem projects, said shuttle means comprising:
a crown member received within said auxiliary piston bore and disposed in sealing engagement therewith, a base member disposed for engagement by said primary piston, and a tubular sidewall disposed in radially spaced relation about said valve stem thereby defining an annular flow passage connecting said primary pressure chamber in fluid communication with said auxiliary pressure chamber.

* * * * *